US005396407A

United States Patent [19]

Taniuchi

[11] Patent Number: 5,396,407

[45] Date of Patent: Mar. 7, 1995

[54] HEADLIGHT FOR IRRADIATING LIGHT BEAM FOR A VEHICLE PASSING BY IN THE OPPOSITE DIRECTION

[75] Inventor: Hitoshi Taniuchi, Tokyo, Japan

[73] Assignee: Stanley Electric Co., Ltd., Tokyo, Japan

[21] Appl. No.: 179,527

[22] Filed: Jan. 10, 1994

Related U.S. Application Data

[62] Division of Ser. No. 977,581, Nov. 17, 1992, Pat. No. 5,303,126.

[30] Foreign Application Priority Data

Nov. 26, 1991 [JP] Japan ................................ 3-335567

[51] Int. Cl.[6] ............................................ B60Q 1/00

[52] U.S. Cl. ..................................... 362/61; 362/302; 362/346

[58] Field of Search ................ 362/61, 302, 303, 304, 362/305, 346

[56] References Cited

U.S. PATENT DOCUMENTS

| | | | |
|---|---|---|---|
| 3,184,591 | 5/1965 | Cibie | 362/61 |
| 4,208,704 | 6/1980 | Draper . | |
| 4,680,679 | 7/1987 | Dilouya . | |
| 4,755,919 | 7/1988 | Lindae et al. | 362/304 |
| 4,841,423 | 6/1989 | Luciani . | |
| 4,928,214 | 5/1990 | Oyama . | |
| 4,953,063 | 8/1990 | Nino . | |
| 4,992,911 | 2/1991 | Ressia . | |
| 5,093,766 | 3/1992 | Masuyama . | |
| 5,215,368 | 6/1993 | Neumann . | |

FOREIGN PATENT DOCUMENTS

| | | |
|---|---|---|
| 4034924A1 | 5/1991 | Germany . |
| 928213 | 6/1963 | United Kingdom . |

*Primary Examiner*—Richard A. Bertsch
*Assistant Examiner*—M. Kocharov
*Attorney, Agent, or Firm*—Frishauf, Holtz, Goodman & Woodward

[57] ABSTRACT

A headlight exclusively for irradiating a light beam for a vehicle passing by in the opposite direction includes a light source and a reflective mirror as essential components. The reflective mirror has a first reflective surface having a contour of revolving parabolic plane on an upper half of the reflective mirror, a second reflective surface having a contour of revolving parabolic plane arranged at the central part of a lower half of the reflective mirror, and two reflective surfaces each having a contour of a cylindrical parabolic plane arranged on the opposite side of the second reflective surface on the lower half of the reflective mirror. The last-mentioned reflective surfaces comprise a first surface and a second surface. The first surface serves to allow the light beam to be converged in the shape of substantially parallel light beam as seen in one direction, and the second surface serves in the same manner as the first surface in another direction at a right angle relative to the former. The headlight may be designed in the upside-down relationship relative to the aforementioned headlight such that all of the essential components are arranged upside down.

3 Claims, 3 Drawing Sheets

HEADLIGHT FOR IRRADIATING LIGHT BEAM FOR A VEHICLE PASSING BY IN THE OPPOSITE DIRECTION

This is a division of application Ser. No. 07/977,581, filed Nov. 17, 1992, U.S. Pat. No. 5,303,126.

BACKGROUND OF THE INVENTION

1. Field of the Invention

The present invention relates generally to a headlight mounted on a vehicle. More particularly, the present invention relates to a headlight exclusively usable for irradiating a light beam for a vehicle passing by in the opposite direction (hereinafter referred to simply as a headlight).

2. Background Art

To facilitate understanding of the present invention, a typical conventional headlight of the foregoing type will briefly be described below with reference to FIG. 5. The headlight designated by reference numeral 90 includes a light source 91 composed of a filament in a halogen lamp and a reflective mirror 92 arranged behind the light source 91, and wherein a focus f of the reflective mirror 92 having a contour of revolving parabolic plane is located at the shown position on an axis line of the light source 91. As shown in FIG. 5, a lower half of the light source 91 is covered with a hood 93. With this construction, since the focus f of the reflective mirror 92 is located behind the light source 91, only the reflected light beam reflected from an upper half of the reflective mirror 92 is practically used for the purpose of irradiating a light beam for a vehicle passing by in the opposite direction. Consequently, the headlight 90 exhibits light distribution properties for irradiating a light beam for a vehicle passing by in the opposite direction without irradiation of any dazzling light beam, i.e., an upward oriented light beam.

It should be added that a lens (not shown) is disposed at the position located forward of the reflective mirror as seen in the light irradiating direction so that the light distribution properties of the headlight 90 having a fundamental configuration is optimized in cooperation with the light source 91 with the reflective mirror 92.

With the conventional headlight. 90 constructed in the above-described manner, however, since the desired light distribution properties of the headlight 90 are obtainable by covering the lower half of the light source 91 with the hood 93, merely about a half of the light beam irradiated from the light source 91 can actually be utilized for the afore-mentioned purpose. Consequently, the headlight 90 is visually recognized with less brightness compared with the electricity practically consumed by the light source 91. In other words, the headlight 90 has a problem that it practically utilizes only a part of the light beam generated by the light source 91, resulting in the headlight 90 operating at a low efficiency.

SUMMARY OF THE INVENTION

The present invention has been made in consideration of the aforementioned problem to be solved.

An object of the present invention is to provide a headlight exclusively usable for irradiating a light beam at a high efficiency when a vehicle is passing by in the opposite direction.

According to the present invention, there is provided a headlight exclusively usable for irradiating a light beam for a vehicle passing in the opposite direction, the headlight including a light source and a reflective mirror as essential components, wherein the reflective mirror comprises a first reflective surface having a contour of a revolting parabolic plane arranged on an upper half of the reflective mirror so as to cause a light beam generated by the light source to be reflected in the form of a substantially parallel light beam oriented in a suitably determined downward direction, a second reflective surface having a contour of revolving parabolic plane arranged at the central part of a lower half of the reflective mirror so as to cause the light beam generated by the light source to be reflected in the form of a substantially parallel light beam oriented in another suitably determined downward direction, and two reflective surfaces each having a contour of a cylindrical parabolic plane so as to cause the light beam generated by the light source to be irradiated in the irradiating direction of the headlight, the reflective surfaces being arranged on opposite sides of the second reflective surface on the lower half of the reflective mirror and comprising a first surface and a second surface, the first surface serving to cause the light beam generated by the light source to be converged in the shape of a substantially parallel light beam as seen in one direction and the second surface serving to cause the light beam generated by the light source to be converted in the shape of a substantially parallel light beam as seen in another direction at a right angle relative to the one direction.

It is preferable that the light source is covered with a hood for covering the second reflective surface of the reflective mirror therewith.

In addition, it is preferable that a focus of the first reflective surface of the reflective mirror is located at the position rearward of the light source on an axis line of the light source, while a focus of the second reflective surface of the reflective mirror is located at the position forward of the light source.

Alternatively, the headlight constructed in the above-described manner may be designed in the upside-down relationship relative to the first-mentioned headlight such that all the essential components are arranged upside down.

Other objects, features and advantages of the present invention will become apparent from reading the following description in conjunction with the accompanying drawings.

DETAILED DESCRIPTION OF THE PREFERRED EMBODIMENTS

The present invention will now be described in detail hereinafter with reference to the accompanying drawings which illustrate preferred embodiments thereof. It should be noted that terms of "upward direction", "downward direction", "forward direction", "rearward direction", "left-hand", "leftward direction", "right-hand", "rightward direction" or the like appearing in the following description represent the operative state of a headlight to be described later while a driver sitting on his seat is taken as a reference.

Figure 1:
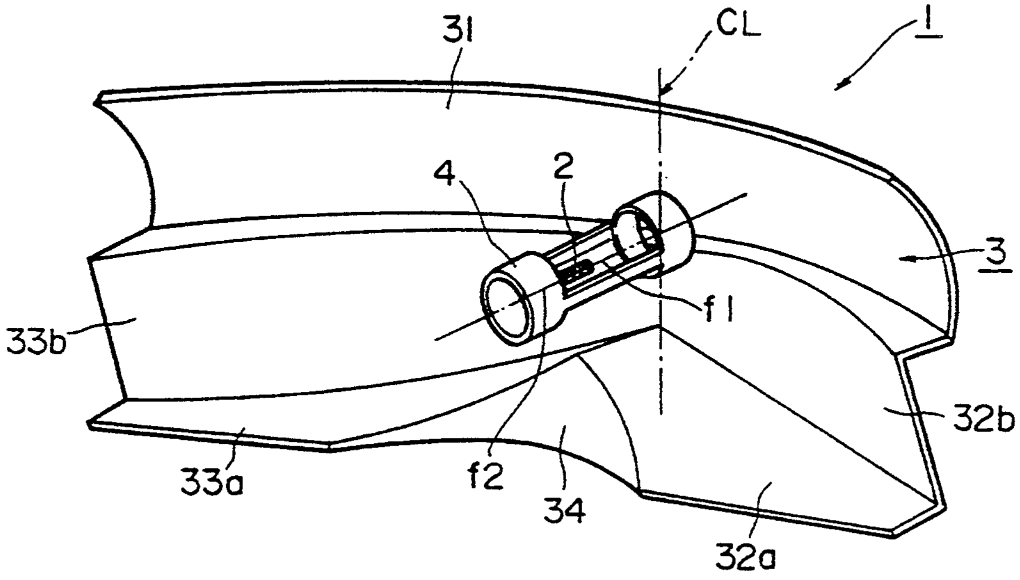
FIG. 1 is a fragmentary exploded perspective view of a headlight for irradiating a light beam for a vehicle passing by in the opposite direction in accordance with a first embodiment of the present invention.
Figure 5:
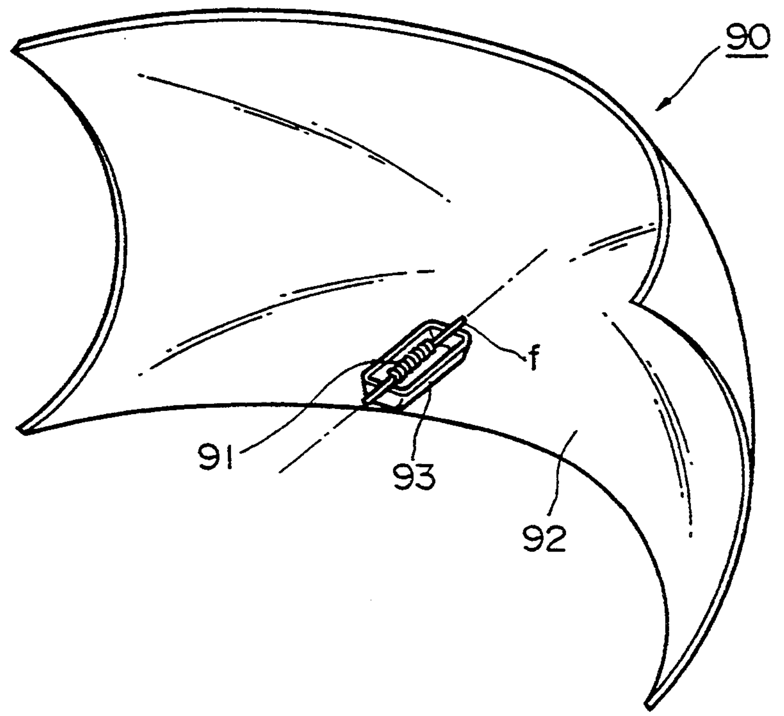
FIG.5 PRIOR ART
FIG. 5 is a fragmentary exploded perspective view of a conventional headlight for irradiating a light beam for a vehicle passing by in the opposite direction.

FIG. 1 illustrates a first embodiment of the present invention, particularly showing essential components of a headlight 1 exclusively usable for irradiating a light beam for a vehicle passing by in the opposite direction (hereinafter referred simply as a headlight 1). The headlight 1 is basically the same as the conventional headlight 90 described above with reference to FIG. 5 in respect to light distribution properties derived from a light source 2 and a reflective mirror 3.

In the FIG. 1 embodiment, the reflective mirror 3 is divided into two parts, i.e., an upper half and a lower half. Specifically, the upper half of the reflective mirror 3 comprises a first reflective surface 31 having a contour of revolving parabolic plane of which focus f1 is located rearward of the light source 2, while the lower half of the reflective mirror 3 comprises a first left-hand reflective surface 32*a,* a second left-hand reflective surface 32*b,* a first right-hand reflective surface 33*a* and a second right-hand reflective surface 33*b* each having a contour of a cylindrical parabolic plane. As is apparent from the drawing, the first right-hand reflective surface 33*a* and the second right-hand reflective surface 33*b* are arranged symmetrically relative to the first left-hand reflective surface 32*a* and the second left-hand reflective surface 32*b.* In addition, the lower half of the reflective mirror 3 includes a second reflective surface 34 having a contour of revolving parabolic plane of which focus f2 is located forward of the light source 2. The light source 2 is partially covered with a hood 4 which serves to block light from a part of the second left-hand reflective surface 32*b* and the second right-hand reflective surface 33*b.*

Next, a structure of each of the first left-hand reflective surface 32*a,* the second left-hand reflective surface 32*b,* the first right-hand reflective surface 33*a,* the second right-hand reflective surface 33*b* and the second reflective surface 34 all of which constitute a characterizing feature of the present invention will be described below.

Since the first right-hand reflective surface 33*a* and the second right-hand reflective surface 33*b* are arranged symmetrically relative to the first left-hand reflective surface 32*a* and the second left-hand reflective surface 32*b* with a center line CL extending in the upward/downward direction located therebetween as mentioned above, description will be made below only with respect to the first left-hand reflective surface 32*a* and the second left-hand reflective surface 32*b* for the purpose of simplification.

First, the first left-hand reflective surface 32*a* is designed to exhibit a cylindrical parabolic plane in the following manner. When the first left-hand reflective surface 32*a* is sectioned in the upward/downward direction, a parabolic line appears, and when it is sectioned in the other direction at a right angle relative to the first-mentioned direction, a straight line appears. In this embodiment, the parabolic line appears in the forward/rearward direction of the first left-hand reflective surface 32*a,* and all of the light beam generated by the light source 2 and irradiated to the first left-hand reflective surface 32*a* is reflected to the second left-hand reflective surface 32*b.*

On the other hand, the second left-hand reflective surface 32*b* is likewise designed to exhibit a cylindrical parabolic plane in the following manner. When the second left-hand reflective surface 32*b* is sectioned in the leftward/rightward direction, a parabolic line appears, and when it is sectioned in the upward/downward direction, a straight line appears. The light beam irradiated from the first left-hand reflective surface 32*a* is reflected forward of the front surface of the headlight 1 via the second left-hand reflective surface 32*b.* In other words, the light beam Generated by the light source 2 and irradiated over the-first left-hand reflective surface 32*a* reaches the second left-hand reflective surface 32*b* while it is converged in the form of a substantially parallel light beam as seen in the upward/downward direction, and subsequently, the second left-hand reflective surface 32*b* causes the reflected light beam to be converged again in the form of a substantially parallel light beam as seen in the leftward/rightward direction. At this time, since the second left-hand reflective surface 32*b* is blocked by the hood 4, it does not reflect the light beam irradiated from the light source 2 by itself.

It is preferable that the first left-hand reflective surface 32*a* is designed to have a substantially same angle across the width thereof as seen from the light source 2, causing the width of the first left-hand reflective surface 32*a* to be increasingly reduced as the position comes nearer to the light source 2. With such construction, the second reflective surface 34 of which focus f2 is located forward of the light source 2 is inevitably formed at the position corresponding to the central part of the lower half of the reflective mirror 3.

Next, a mode of operation of the headlight 1 constructed in the aforementioned manner will be described below.

Figure 2:
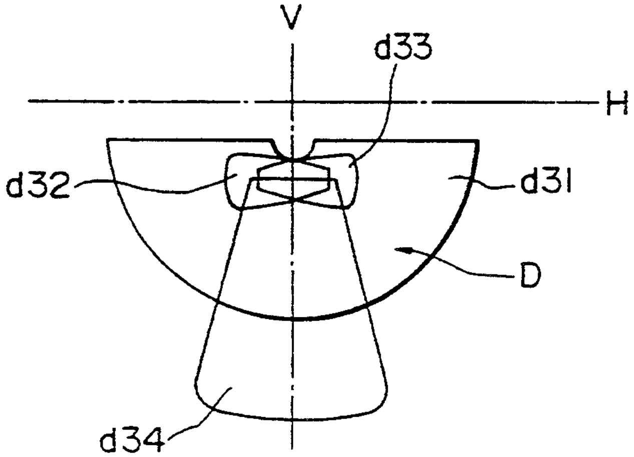
FIG. 2 is an illustrative view which shows by way of example the light distribution properties of the headlight shown in FIG. 1.

FIG. 2 is an illustrative view which shows light distribution properties D of the headlight 1 constructed in accordance with the first embodiment of the present invention.

The first reflective surface 31 is arranged above the light source 2 and the focus f1 of the first reflective surface 31 is located at the position rearward of the light source 2, whereby all the reflected light from the first reflective surface 31 is irradiated in the downward direction as described above with respect to the conventional headlight. Consequently, the reflected light beam from the first reflective surface 31 exhibits light distribution properties d31 having a semicircular contour.

The reflected light beam from the first left-hand reflective surface 32*a* is converged in the form of a substantially parallel light beam as seen in the upward/-downward direction along the first left-hand reflective surface 32*a,* and subsequently, it is converged in the form of a substantially parallel light beam as seen in the leftward/rightward direction along the second left-hand reflective surface 32*b,* whereby it exhibits a substantially sector-shaped light distribution property d32 wherein light is projected at the central part of the light distribution pattern d31 derived from the reflected light beam from the first reflective surface 31. Similarly, light distribution properties d33 derived from the reflected light beam reflected from the first right-hand reflective surface 33*a* and the second right-hand reflective surface 33*b* are recognized wit a substantially sector-shaped contour which in turn is projected at the central part of the light distribution properties d31 in the same manner as mentioned above.

Next, since the focus f2 of the second reflective surface 34 is located forward of the light source 2, the reflected light beam from the second reflective surface 34 is transformed into a downward oriented light beam in the same manner as the first reflective surface 31 and exhibits light distribution properties d34 which are projected on the central part of the light distribution D of the headlight 1 while extending downward of the latter.

The light distribution properties D of the headlight 1 will not be discussed in detail below. As is apparent from FIG. 2, the light distribution pattern D includes the light distribution properties d32, d33 and d34 in addition to the same light distribution pattern d31 as those of the conventional headlight 90. In other words, the headlight 1 of the present invention exhibits more bright light distribution properties than the conventional headlight 90 by a quantity corresponding to the light distribution properties of d32, d33 and d34.

Figure 3:
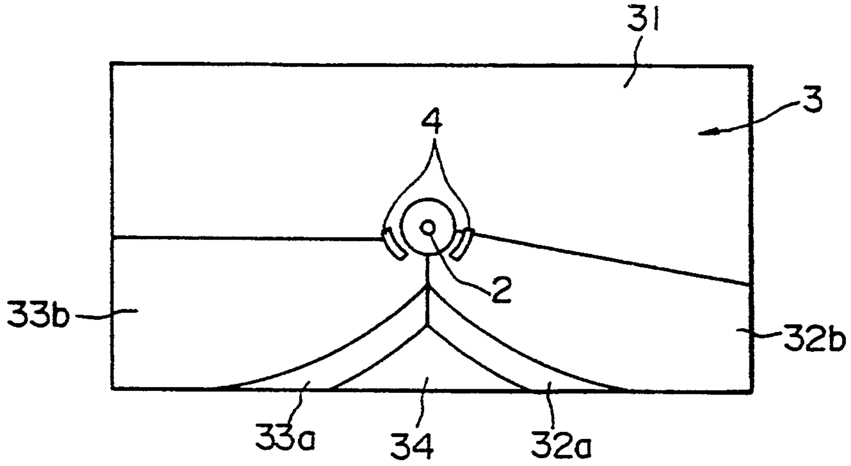
FIG. 3 is a fragmentary front view of the headlight shown in FIG. 1 as seen in the light irradiating direction.

When the headlight 1 is practically used, change or modification may freely be made in the following manner, for example, for the purpose of easily recognizing a left-hand road shoulder when a driver's vehicle runs along the left-hand side of a road. Specifically, as shown in FIG. 3, the first reflective surface 31 may extend downward to the lower half of the reflective mirror 3 in excess of the position corresponding to the light source 1.

Figure 4:
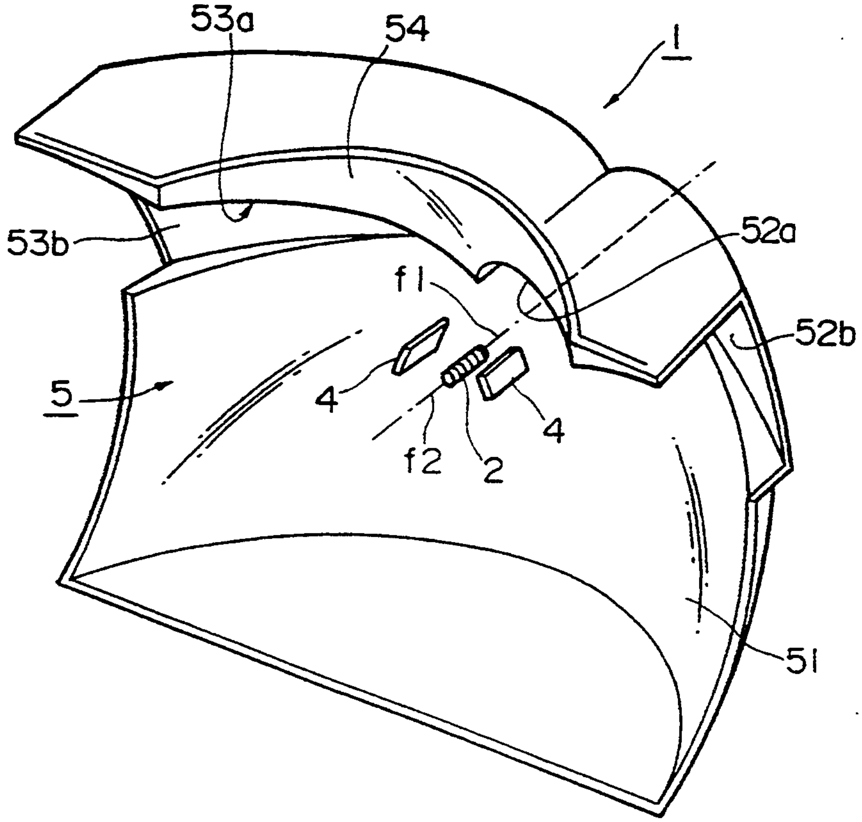
FIG. 4 is a fragmentary exploded perspective view of a headlight for irradiating a light beam for a vehicle passing by in the opposite direction in accordance with a second embodiment of the present invention.

Next, FIG. 4 illustrates a second embodiment of the present invention, particularly illustrating essential components constituting a headlight 1 exclusively usable for irradiating a light beam for a vehicle passing by in the opposite direction (hereinafter referred to simply as a headlight 1). In contrast with the first embodiment of the present invention wherein the first reflective surface 31 is arranged on the upper half of the reflective mirror 3, the second reflective surface 34 is arranged at the central part of the lower half of the same, the first left-hand reflective surface 32*a* and the second left-hand reflective surface 32*b* are arranged on the left-hand side of the lower half of the same, and the first right-hand reflective surface 33*a* and the second right-hand reflective surface 33*b* are arranged on the right-hand side of the lower half of the same, a reflective mirror 5 is contoured in the upside-down relationship in accordance with the second embodiment of the present invention.

In the second embodiment of FIG. 4, a first reflective surface 51 having a revolving parabolic contour is arranged on the lower half of the reflective mirror 5 while a focus f2 of the first reflective surface 51 is located forward of the light source 2. A second reflective surface 54 having a revolving parabolic contour is arranged on the upper half of the reflective mirror 5 while a focus f1 of the second reflective surface 54 is located rearward of the light source 2. With each of the reflective surfaces 51 and 54, a slightly downward oriented reflected light is irradiated therefrom in the same manner as in the first embodiment of the present invention.

A first left-hand reflective surface 52*a* and a second left-hand reflective surface 52*b* arranged on the left-hand side of the second reflective surface 54 are designed with a contour of a cylindrical parabolic plane along which reflected light is converged in the form of a substantially parallel light beam. Similarly, a first right-hand reflective surface 53*a* and a second right-hand reflective surface 53*b* arranged on the right-hand side of the second reflective surface 54 are designed with a contour of a cylindrical parabolic plane along which the reflected light is converged in the form of a substantially parallel light beam extending at a right angle relative to the aforementioned parallel light. With this construction, the light beam generated by the light source 2 is irradiated in the predetermined irradiating direction in the same manner as in the first embodiment of the present invention.

While the present invention has been described above with respect to two preferred embodiments thereof, it should of course be understood that the present invention should not be limited only to these embodiments but various changes or modifications may be made without departure from the scope of the present invention as defined by the appended claims.

What is claimed is:

1. In a headlight exclusively usable for irradiating a light beam for vehicle passing by in an opposite direction, said headlight including a light source and a reflective mirror, and said headlight emitting light in an irradiating direction, the improvement wherein said reflective mirror comprises:

a lower half including a first reflective surface extending continuously in an unbroken manner to opposite sides of said lower half and having a contour of a revolving parabolic plane arranged on the lower half of said reflective mirror so as to cause a light beam generated by said light source to be reflected in the shape of a substantially parallel light beam in a predetermined downward direction, and an upper half including:

a second reflective surface having a contour of a revolving parabolic plane arranged at a central part of the upper half of said reflective mirror so as to cause said light beam generated by said light source to be reflected in the form of a substantially parallel light beam oriented in another predetermined downward direction, and third and fourth reflective surfaces each having a contour of a cylindrical parabolic plane so as to cause said light beam generated by said light source to be irradiated in the irradiating direction of said headlight, said third and fourth reflective surfaces being arranged on opposite sides of said second reflective surface on the upper half of said reflective mirror, and said third and fourth reflective surfaces each comprising a fifth surface and a sixth surface, said fifth surface serving to cause said light beam generated by said light source to be converged in the form of a substantially parallel light beam as seen in one direction and said sixth surface serving to cause said light beam generated by said light source to be converged in the shape of a substantially parallel light beam as seen in another direction at a right angle relative to said one direction.

2. The headlight according to claim 1, wherein said light source is partially covered with a hood for blocking said reflective surface of said reflective mirror from receiving light directly from said light source.

3. The headlight according to claim 1, wherein a focus of said first reflective surface of said reflective mirror is located at a position rearward of said light source on an axis line of said light source, and a focus of said second reflective surface of said reflective mirror is located at a position forward of said light source on an axis line of said said light source.

* * * * *

UNITED STATES PATENT AND TRADEMARK OFFICE
CERTIFICATE OF CORRECTION

PATENT NO. : 5,396,407 Page 1 of 2
DATED : March 7, 1995
INVENTOR(S) : Hitoshi Taniuchi It is certified that error appears in the above-indentified patent and that said Letters Patent is hereby corrected as shown below:

On the Title Page, [57] ABSTRACT, line 15, before "substantially" insert --a--;

Column 4, line 18, change "Generated" to --generated--;

UNITED STATES PATENT AND TRADEMARK OFFICE

CERTIFICATE OF CORRECTION

PATENT NO. : 5,396,407
DATED : March 7, 1995
INVENTOR(S) : Hitoshi Taniuchi

It is certified that error appears in the above-indentified patent and that said Letters Patent is hereby corrected as shown below:

Column 5, line 4, delete "are recognized wit" and insert --have--;

line 6, change "properties" to --pattern--;

line 16, change "not" to --now--;

line 17, change "pattern" to --patterns--.

Signed and Sealed this

Fifth Day of March, 1996

Attest:

BRUCE LEHMAN

*Attesting Officer* *Commissioner of Patents and Trademarks*